United States Patent [19]
DaSilveira

[11] Patent Number: 5,645,015
[45] Date of Patent: Jul. 8, 1997

[54] ADJUSTABLE STANCHION

[76] Inventor: John A. DaSilveira, P.O. Box 1408, Lovington, N. Mex. 88260

[21] Appl. No.: 347,714

[22] Filed: Dec. 1, 1994

[51] Int. Cl.$^6$ ...................................................... A01K 1/08
[52] U.S. Cl. ........................................................ 119/741
[58] Field of Search ................................. 119/741, 740, 119/739, 735, 730, 750

[56] References Cited

U.S. PATENT DOCUMENTS

| Re. 32,728 | 8/1988 | Albers, Sr. | |
|---|---|---|---|
| Re. 34,232 | 4/1993 | DaSilveria | 119/148 |
| D. 326,340 | 5/1992 | DaSilveria | D30/119 |
| 1,021,576 | 3/1912 | Dawson . | |
| 1,077,569 | 11/1913 | Tarcza . | |
| 1,395,882 | 11/1921 | Webb . | |
| 4,037,566 | 7/1977 | Albers | 119/147 |
| 4,051,813 | 10/1977 | Albers | 119/148 |
| 4,185,592 | 1/1980 | Albers, Sr. | 119/148 |
| 4,377,131 | 3/1983 | Vandenberg et al. | 119/741 |
| 4,457,265 | 7/1984 | Anderson | 119/750 |
| 4,476,815 | 10/1984 | Albers, Sr. | 119/147 R |
| 4,495,897 | 1/1985 | Albers, Sr. | 119/148 |
| 4,787,339 | 11/1988 | Heizer, Jr. | 119/730 |
| 4,930,452 | 6/1990 | DaSilveira | 119/148 |
| 4,976,224 | 12/1990 | Hatfield | 119/740 |
| 5,178,096 | 1/1993 | Lock | 119/58 |
| 5,289,798 | 3/1994 | Lock | 119/58 |

FOREIGN PATENT DOCUMENTS

| 2423979 | 11/1979 | France . |
|---|---|---|
| 1297774 | 3/1987 | U.S.S.R. . |

OTHER PUBLICATIONS

Advertisement of Vandenberg Manufacturing Company Inc., UDA, Sep. 1994, p. 3.
Advertisement of Albers Dairy Equipment, UDA, Aug. 1994, p. 15.
Advertisement of Vandenberg Manufacturing Company, Inc., UDA, Aug. 1994, p. 3.
Advertisement of Nielson Ind. Inc., California Dairy Herd Improvement, Jun. 1994, p. 21.
Advertisement of Albers Dairy Equipment, Pacific Northwest Agribusiness Dairyman, Mar.–Apr. 1993, page unknown.
Advertising Material of Accu–Lok of P.O. Box 2078, Tulare, CA 93275. Date unknown.
Advertising Material of Central Supply & Equipment of KRI–Box 41, Tower Hill, IL 62571 Date Unknown.
Advertising Material of Merril Equipment Company of 2209 Sturdevant St., Merril, WI 54452, Dae Unknown.
Pictures of Stunchions in Public Use prior to Dec. 01, 1994.

*Primary Examiner*—Robert P. Swiatek
*Assistant Examiner*—Elizabeth Shaw
*Attorney, Agent, or Firm*—Novak Druce

[57] ABSTRACT

A stanchion comprising a frame having a substantially horizontal extending frame member and having first and second substantially vertical extending side frame members couples to the substantially horizontal extending frame member. The second substantially vertical extending side frame member is displaced generally longitudinally from the first substantially vertical extending side frame member and the frame members define one stanchion opening therebetween. A restraining member is disposed in the stanchion opening, the restraining member being pivotally mounted to the frame for movement between a first position with the restraining member extending diagonally across the stanchion opening and a second position with the restraining member having a substantially vertical orientation.

26 Claims, 2 Drawing Sheets

ADJUSTABLE STANCHION

BACKGROUND OF THE INVENTION

1) Field of the Invention

The present invention relates generally to a stanchion, and more particularly to an adjustable cattle stanchion having a frame with at least one stanchion opening and a pivotal bar positioned in the stanchion opening and pivotally mounted to the frame. The invention further relates to a method of using an adjustable stanchion.

2) Description of the Related Art

Stanchions suitable for holding the head of an animal are known in the art. Stanchions can be used to restrain horses or goats, but are typically used to restrain cattle. The stanchions are generally used to restrain one or more head of cattle for brief periods of time. By restraining cattle during feeding, consumption may be monitored to ensure that the animals are allocated an appropriate amount of food. Restraining the cattle also facilitates veterinary examination and treatment, protecting both the animal and the attendant or veterinarian from potential injury. In dairies, stanchions are often employed to hold the cattle during the milking process. Cattle stanchions may also be used to temporarily separate one or more head of cattle from the herd.

One type of cattle stanchion includes a frame with at least one opening for receiving the head of an animal and a latching mechanism for alternately restraining and releasing the animal. One example of this type of cattle stanchion is shown in U.S. Pat. No. Re. 34,232. The disclosed stanchion includes a pivotal restraining member mounted in the opening of the frame. The pivotal restraining member may be moved between a vertical position for holding the head of an animal and a diagonally-extending position when not in use. The disclosure also includes a latching mechanism which may be set by an attendant to either a latched or an unlatched position. When in the latched position, the latching mechanism will engage the pivot bar as it is pivoted to the vertical position, securing the animal's head with the stanchion. The animal may be released by moving the latching mechanism to the unlatched position. If desired, the attendant may leave the latching mechanism in the unlatched position so that the animals may freely insert their heads into the stanchion and remove their heads from the stanchion.

However, cattle not being the most intelligent of animals, tend not to feed through a stanchion if they have been raised in a pasture without prior exposure to stanchions. If these animals are moved from the pasture to a feeding area with stanchions, these animals may starve without human intervention.

Several designs of stanchions have been patented. Examples of a few are shown in U.S. Pat. No. 5,289,798, U.S. Pat. No. 4,476,815, U.S. Pat. No. 4,051,813, and U.S. Pat. No. 1,077,519. However none of these designs have included disclosure of an adjustable stanchion with a restraining bar for acclimating animals for feeding through a stanchion.

An adjustable stanchion with an adjustable substantially vertical extending side frame member is desirable. With an adjustable side frame member, the adjustable member can be moved to enlarge the stanchion opening so that cattle may feed through the stanchion without having to rotate the pivotal restraining bar. The adjustable side frame member can be moved to slowly close the stanchion opening to acclimate the cattle to the stanchion whereby the cattle would still be able to feed while becoming accustomed to the stanchion. Thus the adjustable member could be returned to its original position and the pasture cattle would be using the stanchion as other acclimated cattle. An adjustable stanchion would thereby provide an improved cattle stanchion by offering a single stanchion that can be used for both acclimated and pasture cattle and a method for acclimating cattle without excessive human involvement. An adjustable stanchion which contained a plurality of adjustable side frame members to accommodate several cattle is similarly desirable.

An adjustable cattle stanchion with a displacing assembly connected to a side frame member whereby the displacing assembly can controllably move the adjustable side frame member to several different sizes to increase or decrease the stanchion opening is also desired.

An adjustable cattle stanchion containing several stanchion openings with a displacing assembly connected to several adjustable side frame members which can move several side frame members concurrently is also desired. By utilizing a displacing assembly, several adjustable side frame members may be moved concurrently, thereby several stanchion openings could be enlarged at once, and thus several heads of cattle could acclimate at one time.

An adjustable cattle stanchion where the adjustable side frame member may be moved in several different orientations in relation to the stationary side member is another desire. The adjustable side frame member could be moved parallel to the stationary side frame member or be moved diagonally to the stationary frame side member whereby the upper end of the adjustable side frame member is pointing toward or away from the stationary side frame member. By allowing several different orientations for the adjustable side frame member, an owner can decide which orientation is best suited to acclimate their cattle to the stanchion.

SUMMARY OF THE INVENTION

Accordingly, a primary object of the present invention is to provide a cattle stanchion with an adjustable side frame member which may be positioned to acclimate cattle to a stanchion.

A further object of the present invention is to provide a method of acclimating cattle to a stanchion.

An additional object of the present invention is to provide a displacing assembly whereby the adjustable side frame member can be controllably moved to allow several different sizes of stanchion openings.

Another object of the present invention is to provide a displacing assembly connected to several adjustable side frame members so that several different stanchion openings may be controlled concurrently.

A further object of the present invention is to provide an adjustable size frame member that may be moved in several different orientations.

A more general object of the present invention is to provide an adjustable stanchion which may be used to efficiently and conveniently acclimate animals to a stanchion and which may be efficiently and inexpensively manufactured and maintained.

In accordance with these aims, the stanchion of the present invention provides a stanchion comprising a frame having a first substantially horizontal extending frame member and having first and second substantially vertical extending side frame members couple the first substantially horizontal extending frame member. The second substantially vertical extending side frame member displaces generally longitudinally from the first substantially vertical extending side frame member and the frame members define a stanchion opening therebetween. A restraining member is disposed in the stanchion opening, the restraining member being pivotally mounted to the frame for movement between a first position with the restraining member extending diagonally across the stanchion opening and a second position with the restraining member having a substantially vertical orientation.

Another embodiment of the present invention provides a stanchion comprising a frame having a first substantially horizontal extending frame member, a second substantially horizontal extending frame member in general proximate coextensive relation to the first frame member. A first substantially vertical extending side frame member couples the first frame member. A second substantially vertical extending side frame member couples the second frame member and the frame members define a stanchion opening therebetween. A restraining member is disposed in the stanchion opening, whereby the restraining member is pivotally mounted to the frame for movement between a first position with the restraining member extending diagonally across the stanchion opening and a second position with the restraining member having a substantially vertical orientation.

The preferred embodiment of the present invention is a stanchion comprising a frame having a first substantially horizontal extending frame member, a second substantially horizontal extending frame member in general proximate relation to the first frame member, a third substantially horizontal extending frame member, a fourth substantially horizontal extending frame member in general proximate relation to the third frame member, a first substantially vertical extending side frame member couples the first and third frame members and a second substantially vertical extending side frame member couples the second and fourth frame members and the frame members define a stanchion opening therebetween. A restraining member is disposed in the stanchion opening, whereby the restraining member is pivotally mounted to the frame for movement between a first position with the restraining member extending diagonally across the stanchion opening and a second position with the restraining member having a substantially vertical orientation.

Another embodiment of the present invention is a method of acclimating animals to a stanchion comprising several steps. The first step is providing a stanchion comprising a frame forming a stanchion opening therebetween, wherein the frame further comprising a first substantially vertical extending side frame member and a second substantially vertical extending side frame member. The second step is displacing the second vertical side frame member from the first vertical side frame member. The third step is moving the second vertical side frame member toward the first side frame member thereby reducing the stanchion opening whereby the animals are acclimated to the stanchion and the stanchion can restrain the animals.

BRIEF DESCRIPTION OF THE DRAWINGS

The present invention is further described in connection with the accompanying drawings, in which.

DETAILED DESCRIPTION OF THE INVENTION

Reference will now be made in detail to the preferred embodiments of the invention, examples of which are illustrated in the accompanying drawings. While the invention will be described in conjunction with some of the invention embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
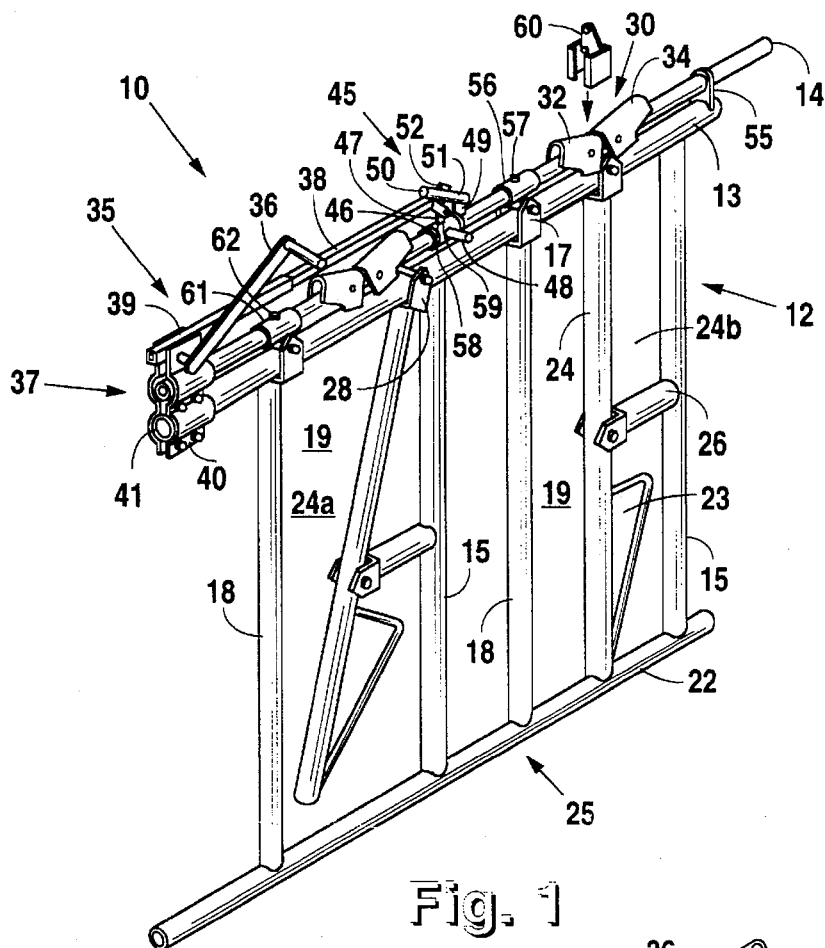
FIG. 1 is a perspective view of an embodiment of the adjustable stanchion showing a plurality of two stanchions. The second substantially vertical extending side frame members are in a secured position.
Figure 3:
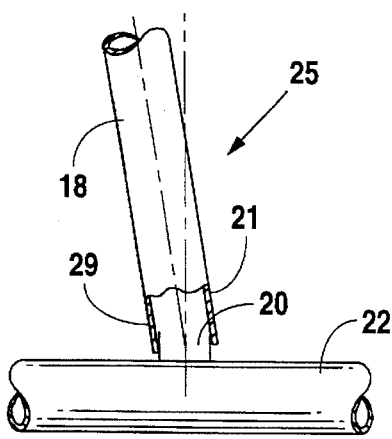
FIG. 3 is an enlarged view of the lower end of the second substantially vertical extending side frame member angularly coupling the protrusion.
Figure 2:
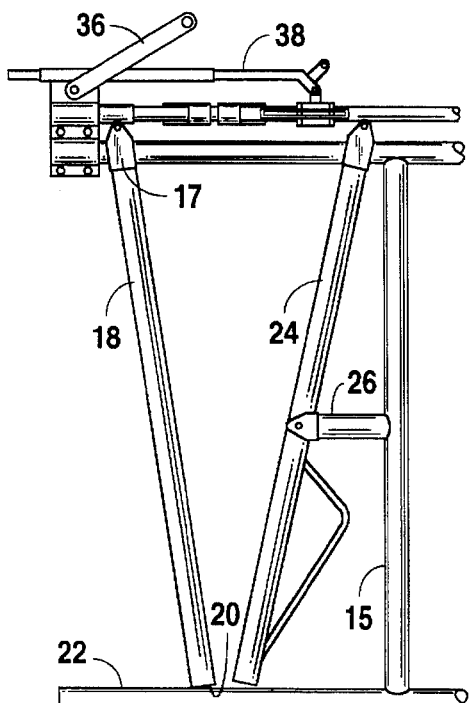
FIG. 2 is a front view of a single stanchion with the second substantially vertical extending side frame member moved longitudinally away from the first substantially vertical extending side frame member to increase the size of the stanchion opening.

One embodiment of the present invention is illustrated in FIGS. 1–3. Referring now to FIG. 1, reference numeral 10 a stanchion, which is preferably made from various size pieces of shaped steel welded together. However, it should be pointed out that the improved stanchion could as well be manufactured from other materials such as metal rods, angle iron, plastic tubes, so that for the purpose of this description the term "member" as used hereinafter shall be understood to include these kinds of materials even though steel pipe is presently preferred due to its strength.

The stanchion 10 generally includes a frame 12 with a plurality of stanchion openings 19 and a plurality of substantially vertical extending side frame members 15 and 18 comprising a plurality of first substantially vertical extending side frame members 15 and second substantially vertical extending side frame members 18. Two openings are shown in FIG. 1; however, it is to be understood that frame 12 may include any number of stanchion openings 19. Each frame 12 comprises first and second substantially vertical extending side frame members 15 and 18, a substantially horizontal extending first frame member 13 and a substantially horizontal extending second frame member 14, which is preferably a horizontally extending locking frame rail. Side frame member 15 couples with horizontal frame member 13. Side frame member 18 couples with horizontal frame member 14. The upper end of side frame member 18 includes a supporting ring 17 which encircles frame member 13 whereby the ring 17 can slide over frame member 13. Referring to FIGS. 1 and 3, a protrusion 20 couples with the lower end of side frame member 18 whereby the protrusion 20 secures side frame member 18 as illustrated in FIG. 1. In a preferred form of this embodiment, frame 12 also includes a substantially horizontal extending third frame member 22 which couples side frame member 15 and protrusion 20. Stanchion 10 also includes a restraining member 24 pivotally mounted to one of the side frame members of each stanchion opening 19 for safely restraining the head of an animal.

In FIG. 1, restraining member 24, which is preferably a restraining bar, couples lateral arm 26 mounted to side frame member 15. As shown in FIG. 1, the restraining member 24 may be pivoted between a first position extending diagonally across the stanchion opening as shown at 24a and a second, substantially vertical position as in the stanchion opening as shown at 24b. When the restraining member 24 is in the position of stanchion opening 24a, an animal may insert its head into the area of the stanchion opening 19 above restraining member 24. When the animal lowers its head, the restraining member 24 is pivoted to the vertical position shown in stanchion 24b. Since the area between the vertically oriented restraining member 24 and side frame member 18 is narrower than the animal's head, locking the restraining member 24 in the vertical position will restrain the animal in the stanchion. When unlatched, the restraining member 24 may be pivoted by the animal to the diagonally-extending position of stanchion 24a so that the animal may remove its head. The upper end of the restraining member 24 includes a retaining ring 28 which is mounted to first frame member 13. The retaining ring 28 slides along the first frame member as the restraining member 24 pivots about lateral arm 26. Retaining ring 28 is shaped to extend above the first frame member 13 so that the ring 28 may be engaged by a latching assembly 30, comprising a plurality of latches 32 and 34 mounted upon second frame member 14, to secure the restraining member 24 in the vertically oriented position of stanchion opening 24b. Theses latches 32 and 34 are of the nature described in U.S. patent application Ser. No. 08/121,782, to DaSilveira. Restraining member 24 also preferably includes an angular arm 23 which prevents the insertion of an animal head into the area below the lateral arm 26 and the restraining member 24. Angular arm 23 also serves as a weight bar which causes restraining member 24 to pivot to the open position of 24a if member 24 is left unlatched.

A displacing assembly 35 comprising a handle 36, a gear means 37 comprising a gear (not shown), an elongated bar 38 wherein one end has a serrated side, an elongated bar sheath housing 39, and a plurality of brackets 40 and 41. The handle 36 couples the gear via an opening (not shown) in the bracket 40 where the brackets 40 and 41 couple together around first frame member 13 and second frame member 14. The gear resides inside of brackets 40 and 41 wherein brackets 40 and 41 contain and support the gear and handle 36. The serrated side is on the lower side of the elongated bar 38. The elongated bar 38 is supported by the elongated bar sheath housing 39 which exposes the serrated side of the elongated bar 38 to the gear. The elongated bar 38 couples second frame member 14 via a network of links 45. The second frame member 14 in turn pivotally couples the supporting ring 17. Supporting ring 17 attaches to frame member 14 via cylindrical sleeve 56 which forms a slit (not shown) and cylindrical sleeve screw 57. As shown in FIG. 3, the securing assembly 25 comprising member 18 whose lower end forms cavity 21 and protrusion 20 whereby the interior walls 29 of the lower end pivotally couple with protrusion 20.

To operate the displacing assembly 35 to displace second side frame member 18 away from first side frame member 15, an attendant rotates handle 36 as shown in FIG. 1 in a counterclockwise manner which rotates the gear counterclockwise inside of brackets 40 and 41. When displacing member 18 away from member 15, it is preferred to have restraining bar 24 unlatched and in the open position of 24a. The gear interacts with serrated side of the elongated bar 38 whereby the elongated bar 38 moves in a longitudinal motion; more precisely the network of links 45 coupling elongated bar 38 move closer to brackets 40 and 41. As the network of links 45 moves closer, the longitudinal motion of elongated bar 38 transfers to the second frame member 14 via the network of links 45 whereby the second frame member 14 moves in the same general direction as elongated bar 38. This longitudinal motion transfers to second side frame member 18 through supporting ring 17 which slides along the first frame member 13 away from first side frame member 15, which increases the size of stanchion opening 19. Referring to FIGS. 2 and 3, this longitudinal motion is reflected by displacing the upper end of second side frame member 18 farther from first side frame member 15 than its lower end. As the upper end of second side frame member 18 moves away from first side frame member 15, the lower end pivots on protrusion 20 as shown in FIG. 3.

When the attendant wants to decrease the size of stanchion opening 19, they turn handle 36 clockwise converting into a longitudinal motion via the gear and elongated bar 38. This motion transfers from the bar 38 to the second frame member 14 through the network of links 45 which moves away from brackets 40 and 41. This in turn moves the second side frame member 18 toward the first side frame member 15 to decrease the size of stanchion opening 19. The lower end of second side frame member 18 pivots on protrusion 20 and as the second side frame member 18 returns to its original position as illustrated in FIG. 1, the interior walls 29 of the lower end of the second side frame member 18 pivotally couples with protrusion 20 whereby the second side frame member 18 is in a substantially vertical orientation.

The latching assembly comprising latches 32 and 34 can be orientated into an engaged or disengaged orientation. If engaged, the restraining member 24 will be latched by latches 32 and 34 in a substantially vertical position as shown by 24b in FIG. 1, whereby an animal will be restrained from removing its head from stanchion opening 19. If disengaged, the restraining member 24 will not engage latches 32 and 34 and an animal will be free to remove its head from the stanchion. The engaged and disengaged positions are of the nature described in U.S. patent application Ser. No. 08/121,782, to DaSilveira.

The mechanism to engage and disengage the latches 32 and 34 comprises the second frame member 14, support 55, rotation sleeve 46, cylindrical sleeves 56 and 61, cylindrical sleeve screws 57 and 62, and a network of links 45 comprising engage post 47, disengage post 48, support post 49, angle link 50, U-shaped detachable link 51, and coupling link 52. The support 55 connects the first frame member 13 and forms a circular opening where the second frame member 14 is positioned within and extended through the opening. Cylindrical sleeve 56 couples second frame member 14 by a cylindrical sleeve screw 57 with the second frame member 14. When rotating second frame member 14, the screw 57 slides in the slit (not shown) in the cylindrical sleeve. The cylindrical sleeve 56 in turn pivotally couples supporting ring 17. A rotation sleeve 46 is welded approximately midway onto second frame member 14. Welded onto the rotation sleeve 46 is the engage post 47 and the disengage post 48 which are approximately 90 degrees apart. While the latches 32 and 34 are engaged, the angle link 50 couples via a bolt 58 and nut (not shown) with the engage post 47. A coupling link 52 is welded approximately perpendicular onto the angle link 50. A support post 49 is welded onto the second frame member 14 and is parallel to the engage post 47 when the latches 32 and 34 are engaged. A U-shaped detachable link 51 pivotally couples the support post 49 and can be detachably coupled around the coupling link 52.

To disengage the latches 32 and 34 an attendant uncouples U-shaped detachable link 51 from coupling link 52. Next grasping coupling link 52 the second frame member 14 rotates until the disengage post 48 is parallel with the support post 49. The cylindrical sleeve screws 57 and 62 slide within slits (not shown) of cylindrical sleeves 56 and 61. The second frame member 14 rotates within support 55, brackets 40 and 41, and cylindrical sleeves 56 and 61. Once the disengage post 48 is parallel with the support post 49, the U-shaped detachable link 51 pivotally couples around coupling link 52.

For manually locking the restraining member 24 in a vertical position independent of the rotational orientation of second frame member 14, a locking device 60 may couple with latches 32 and 34 and retaining ring 28. Locking device 60 is of the nature described in U.S. patent application Ser. No. 08/121,782, to DaSilveira.

Figures 4, 6:
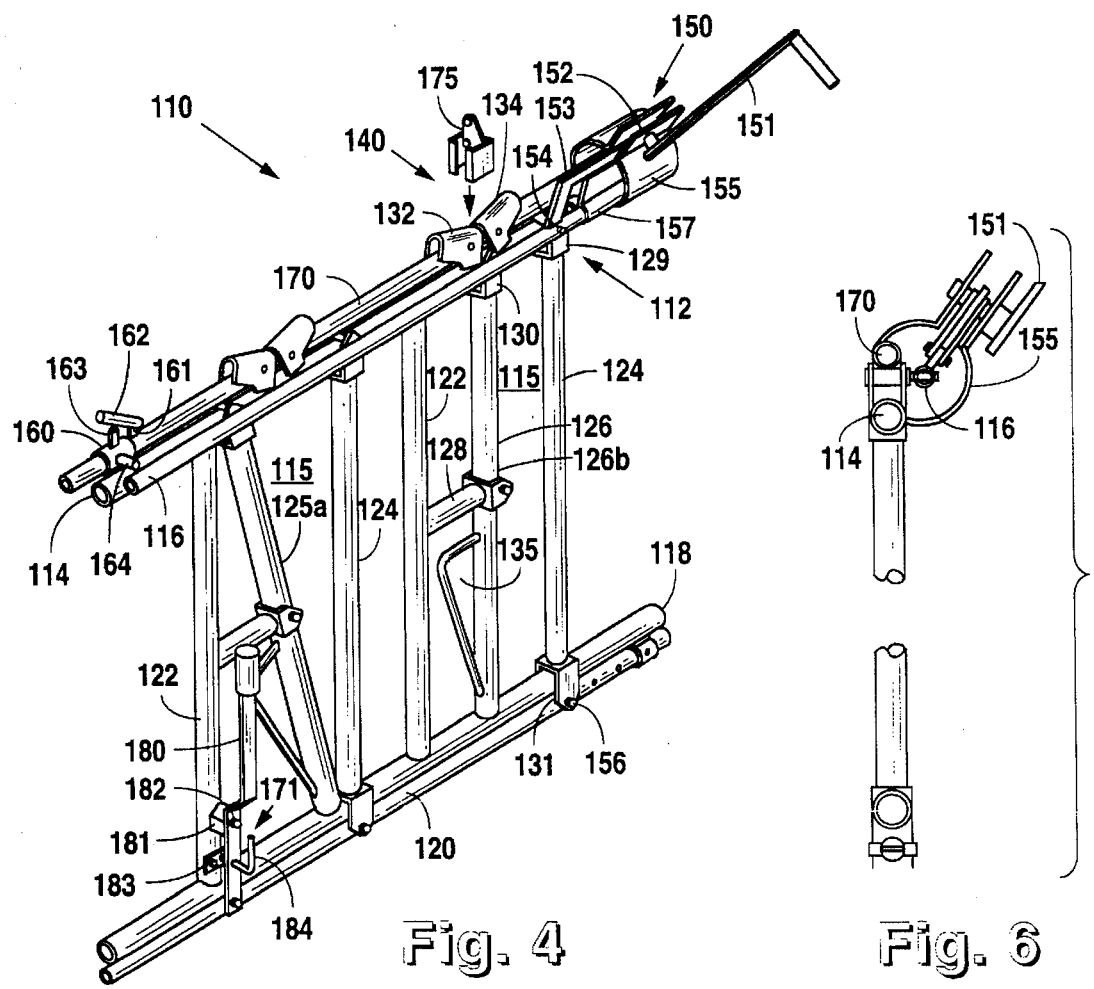
FIG. 4 is perspective view of the preferred embodiment showing a plurality of stanchions with the second substantially vertical extending side frame members in a secured position.
FIG. 6 is side view taken along the plane of line 6—6 in FIG. 6 of the displacing assembly.

Referring now to FIG. 4 which illustrates the preferred embodiment of a stanchion, the stanchion 110 generally includes a frame 112 with a plurality of stanchion openings 115 and a plurality of substantially vertical extending side frame members 122 and 124 comprising a plurality of first substantially vertical extending side frame members 122 and second substantially vertical extending side frame members 124. Two openings are shown in FIG. 4; however, it is to be understood that frame 112 may include any number of stanchion openings 115. Each frame comprises a first substantially vertical extending side frame member 122 and a second substantially vertical extending side frame member 124, a substantially horizontal extending first frame member 114, a substantially horizontal extending second frame member 116 in general proximate relation to the first frame member 114, a substantially horizontal extending third frame member 118, and a substantially horizontal extending fourth frame member 120 in general proximate relation to the third frame member 118. The side frame member 122 is welded to first frame member 114 and to third frame member 118. Side frame member 124 pivotally couples second frame member 116 and fourth frame member 120 whereby all frame members form frame 112. Side frame member 124 has an upper supporting ring 129 at its upper end encompassing the circumference of first frame member 114 and a lower supporting ring 131 at its lower end encompassing the circumference of the third frame member 118. Stanchion 110 also includes a restraining member 126, which is preferably a restraining bar, pivotally mounted to one of the side frame members of each stanchion opening 115 for safely restraining the head of an animal.

In FIG. 4, restraining member 126 couples to lateral arm 128 mounted to side frame member 122. As shown in FIG. 4, the restraining member 126 may be pivoted between a first position extending diagonally across the stanchion opening 126a and a second, substantially vertical position as in stanchion opening 126b. When the restraining member 126 is in the position of stanchion opening 126a, an animal may insert its head into the area of the stanchion opening above restraining member 126. When the animal lowers its head, the restraining member 126 is pivoted to the vertical position shown in stanchion 126b. Since the area between the vertically oriented restraining member 126 and side frame member 124 is narrower than the animal's head, locking the restraining member 126 in the vertical position will restrain the animal in the stanchion. When unlatched, the restraining member 126 may be pivoted by the animal to the diagonally-extending position of stanchion 126a so that the animal may remove its head. The upper end of the restraining member 126 includes a retaining ring 130 which is mounted to first frame member 114. The retaining ring 130 slides along the first frame member 114 as the restraining member 126 pivots about lateral arm 128. Retaining ring 130 is shaped to extend above the first frame member 114 so that the ring may be engaged by a latching assembly 140, which comprises a plurality of latches 132 and 134.

Figure 5:
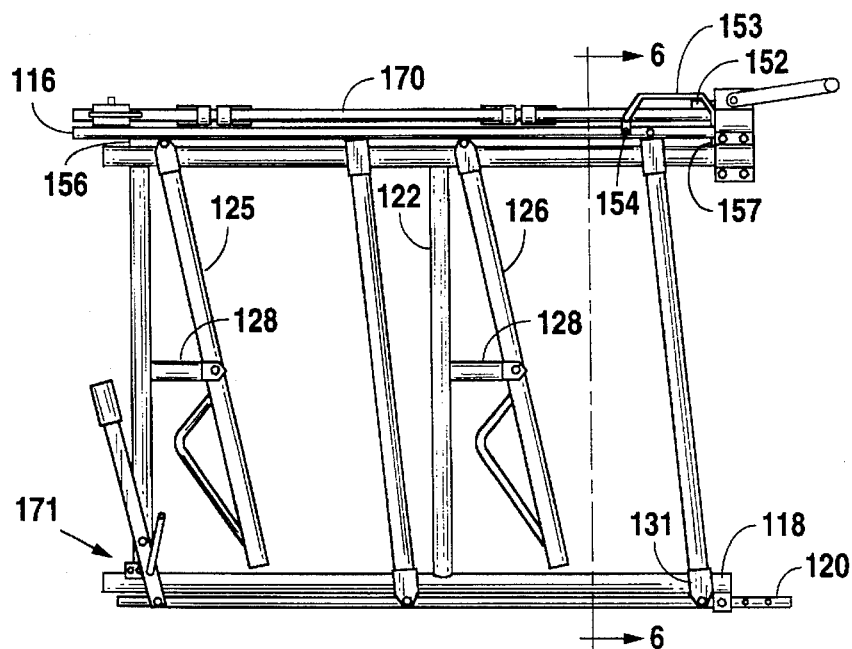
FIG. 5 is a front view of a plurality of stanchions, with the fourth frame member moved to increase the size of the stanchion opening by displacing the second substantially vertical extending side frame member generally diagonally, longitudinally from the first substantially vertical extending side frame member.

Referring to FIG. 5, in the preferred embodiment of the invention a plurality of brackets 156 and 157 are welded at approximately either end of the first frame member 114. Brackets 156 and 157 each form an opening in their respective ends. A substantially horizontal extending fifth frame member 170, which is preferably a horizontally extending locking frame rail, couples to brackets 156 and 157 by being inserted and extended through holes (not shown) in brackets 156 and 157. The fifth frame member 170 is in general proximate coextensive relation to the first frame member 114. The latches 132 and 134 are mounted to the fifth frame member 170 securing the restraining member 126 in the vertically oriented position of stanchion opening 126b. These latches 132 and 134 are of the nature described in U.S. patent application Ser. No. 08/121,782, to DaSilveira. Restraining member 126 also preferably includes an angular arm 135 which prevents the insertion of an animal head into the area below the lateral arm 128 and the restraining member 126. Angular arm 135 also serves as a weight bar which causes restraining member 126 to pivot to the open position of 126a if member 126 is left unlatched.

The latching assembly 140 can be orientated into an engaged or disengaged orientation. If engaged, the restraining member 126 will be latched by latches 132 and 134 in a substantially vertical position as shown by 126b in FIG. 1, whereby an animal will be restrained from removing its head from stanchion opening 115. If disengaged, the restraining member 126 will not engage latches 132 and 134 and an animal will be free to remove its head from the stanchion. The engaged and disengaged positions are of the nature described in U.S. patent application Ser. No. 08/121,782, to DaSilveira.

The mechanism to engage and disengage the latches 132 and 134 comprises of fifth frame member 170, rotation sleeve 160, support post 161, U-shaped detachable link 162, engage post 163, and disengage post 164. The rotation sleeve 160 is welded onto one end of the fifth frame member 170. Support post 161 is welded proximate to the rotation sleeve 160. The U-shaped detachable link 162 pivotally couples the support post 161. The engage post 163 is welded onto the rotation sleeve 160. The disengage post 164 welded approximately 90 degrees away from the engage post 163 on the rotation sleeve 160. When the latches 132 and 134 are engaged, the engage post 163 is parallel to the support post 161 and the U-shaped detachable link 162 detachably couples around the engage post 163.

To disengage the latches 132 and 134, the attendant will first pivot the detachable link 162 upwards uncoupling link 162 from the engage post 163. Grasping the uncoupling link 162, the attendant will rotate the fifth frame member 170 until the disengage post 164 is parallel with the support post 161, at which point the latches 132 and 134 will be disengaged. Then the attendant will pivotally couple the U-shape detachable link 162 to couple around the disengage post 164.

For manually locking the restraining member 126 in a vertical position independent of the rotational orientation of fifth frame member 170, a locking device 175 may couple with latches 132 and 134 and retaining ring 130. Locking device 175 is of the nature described in U.S. patent application Ser. No. 08/121,782, to DaSilveira.

Referring to FIGS. 4 and 5, a first handle 180 couples a pivot support 181 which in turn couples member 122. Handle 180 also couples member 120. A positioning bracket 183 couples member 122. Handle 180 detachably couples bracket 183 via adjusting pin 184. Positioning bracket 183 contains a plurality of coupling points 171 for adjusting member 124 with respect to member 122 by sliding member 120 longitudinally via handle 180. A pivot bolt 182 pivotally mounts handle 180 to support 181.

Referring to FIGS. 4–6, the displacing assembly 150 comprises a second handle 151, a link 152, arched member 153, a post 154, and a support housing 155. The support housing 155 couples to the first frame member 114. The support housing 155 has a hole (not shown) where the handle 151 pivotally couples the link 152 and extends through the opposing side of the support housing 155. The arched member 153 pivotally couples link 152 and to post 154. The post 154 is welded to the second frame member 116.

In the preferred embodiment it is desirable to allow an attendant several different options orientating side frame member 124 with respect to side frame member 122. The first option is displacing side frame member 124 diagonally where upper supporting ring 129 is farther from side frame member 122 than lower supporting ring 131. Referring to FIG. 4, an attendant exercising this option pushes the handle 151 downward clockwise. When displacing member 124 from member 122, it is preferred to have restraining member 126 in the open position of 126a. The rotation of the handle 151 causes the link 152 to invert thus displacing the arch member 153. This in turn displaces the post 154 coupled to the second frame member 116 toward the support housing 155. The pivotally coupling of upper supporting ring 129 with the second frame member 116 causes the upper supporting ring 129 to be thrust outwards and upwards toward the support housing 155. The ring 129 will slide along first frame member 114 toward the support housing 155.

The second option is displacing side frame member 124 parallel to side frame member 122. Referring to FIG. 4, the plurality of coupling points 171 further comprises three holes, which are referred to as left, middle and right. For parallel displacement of side frame member 124, an attendant pushes handle 151 downward clockwise until the handle 151 becomes horizontal while another attendant at the same time pulls handle 180 away from member 122 by removing adjusting pin 184 from the left hole and repositioning pin 184 in the right hole as shown in FIG. 5. This will thrust both upper and lower supporting rings 129 and 131 away and parallel from side frame member 122.

The third option is displacing the side frame member 124 diagonally where lower supporting ring 131 is farther from side frame member 122 than upper supporting ring 129. An attendant exercising this option pulls handle 180 away from member 122 by removing pin 184 from the left hole as shown in FIG. 4 and repositioning pin 184 in the right hole as shown in FIG. 5. This would thrust the lower supporting ring 131 outward while leaving the handle in its original position as shown in FIG. 5.

Another form of stanchion 110 takes the form as shown in FIG. 4, except member 120, first handle 180, pivot support 181, pivot bolt 182, positioning bracket 183, and adjusting pin 184 are eliminated. Member 124 pivotally couples member 118. Thus member 124 displaces only diagonally to member 122 by turning handle 151 whereby upper supporting ring 129 is farther from side frame member 122 than lower supporting ring 131.

Another embodiment of the invention is a method of acclimating animals to a stanchion by using the present invention. The first step is providing the embodiment of the invention of stanchion 10 as shown by FIG. 1 wherein the stanchion 10 further comprising a frame 12, a first substantially vertical extending side frame member 15, and a second substantially vertical extending side frame member 18, which form stanchion opening 19. The acclimation method is conducted over a period of three days where member 18 is displaced and then moved longitudinally, chronologically toward member 15. The second step is an attendant rotates handle 36 counterclockwise displacing diagonally a predetermined distance which is approximately between 0.39 meter to 0.50 meter the upper end of side member 18 from side member 15 as shown by FIG. 2. The third step begins one day later by turning the handle 36 clockwise one-third of the amount turned counterclockwise the previous day moving side member 18 toward side member 15 and thereby reducing stanchion opening 19. The one-third clockwise turn step is repeated once on the second day and once again on the third day at which time the side frame member 18 will be at its original position as shown in FIG. 1 and the animals will be acclimated to the stanchion 10 and the stanchion 10 can restrain the animals.

The preferred embodiment of stanchion 110, further comprising frame 112, a first substantially vertical extending side frame member 122, and a second substantially vertical extending side frame member 124 which form stanchion opening 115, can also be used to acclimate animals. Three different possibilities exist for acclimating an animal to stanchion 110 as shown by FIG. 4. The first possibility is a three day process where member 124 is displaced and then moved longitudinally, chronologically toward member 122. The first step is providing stanchion 110. The second step is displacing diagonally frame member 124 from side frame member 122 where the upper supporting ring 129 is farther from side frame member 122 than lower supporting ring 131. An attendant lowers handle 151 clockwise whereby upper supporting ring 129 is displaced longitudinally a predetermined distance which is approximately 0.38 meter to 0.51 meter from side frame member 122. The third step begins one day later when the attendant rotates handle 151 counterclockwise one-third of the amount rotated clockwise the day before moving side member 124 toward side member 122 and thereby reducing stanchion opening 115. The one-third counterclockwise rotation step is repeated once on the second day. The one-third rotations can be aligned to either of two holes (not shown) in the upper corners of support housing 155. The one-third rotation is repeated once again on the third day at which time the side frame member 124 will be at its original position as shown in FIG. 4 and the animals will be acclimated to the stanchion 110 and the stanchion 110 can restrain the animals.

The second possibility also involves using stanchion 110 as shown by FIG. 4 and 5. The second possibility is a two day process where member 124 is displaced longitudinally a predetermined distance and then moved longitudinally, chronologically toward member 122. The first step is providing stanchion 110. The second step is displacing diagonally member 124 where the lower supporting ring 131 is farther away from side frame member 122 than upper supporting ring 129. An attendant pulls handle 180 away from member 122 as shown by FIG. 5 by removing pin 184 from left hole of bracket 183 to the right hole of bracket 183. Thus, the lower supporting ring 131 is approximately 0.51 meter from side frame member 122. The third step occurs one day later when the attendant repositions handle 180 by removing pin 184 from the right hole and repositions pin 184 in the middle hole of bracket 183. This moves member 124 toward member 122 and thereby reducing stanchion opening 115. On the second day the attendant repositions the handle 180 by removing pin 184 from the middle hole and repositions pin 184 in the left hole of bracket 183 whereby the fourth frame member 120 and side frame member 124 will be back to their original position as shown in FIG. 4 whereby the animals will be acclimated to the stanchion 110 and the stanchion 110 can restrain the animals.

The third possibility involves using stanchion 110 as shown by FIG. 4. The third possibility is a five day process and is the preferred method where side frame member 124 is longitudinally displaced a predetermined distance parallel to side frame member 122. The first step is providing stanchion 110. The second step one attendant pulls handle 180 away from member 122 by removing pin 184 from the left hole of bracket 183 and repositioning the pin 184 in the right hole of bracket 183 a while the second attendant simultaneously turns handle 151 downward clockwise displacing side frame member 124 approximately 0.51 meter parallel and from side frame member 122.

The third step begins one day later when the attendant pushes handle 180 toward member 122 by removing pin 184 from the right hole of bracket 183 and repositioning pin 184 in the middle hole of bracket 183 which moves the lower supporting ring 131 toward side frame member 122 thereby reducing stanchion opening 115. The next day the attendant pushes handle 180 back to its original vertical position of FIG. 4 by removing pin 184 from the middle hole of bracket 183 and repositioning pin 184 in the left hole of bracket 183. At this point upper supporting ring 129 is farther from side frame member 122 than lower supporting ring 131. The next day the attendant turns handle 151 counterclockwise one-third of the amount turned clockwise in step two. The next day, day four, the attendant repeats the previous one-third counterclockwise turn of the handle 151. The next day, day five, the attendant repeats the one-third counter-clockwise turn of the handle 151, whereby the side frame member 124 is back to the its original position as seen in FIG. 4 and the animals are acclimated to the stanchion 110 and the stanchion 110 can restrain the animals.

While the preferred embodiment of the invention has been shown and described, it will be apparent to those skilled in this art that various modifications may be made in the embodiment without departing from the spirit of the present invention. Therefore, the embodiments of the invention in which an exclusive property or privilege is claimed are defined as follows:

What is claimed is:

1. A stanchion comprising:
  a frame comprising a substantially horizontal extending first frame member, a substantially horizontal extending second frame member in general proximate relation to said substantially horizontal extending first frame member, a substantially horizontal extending third frame member, a substantially horizontal extending fourth frame member in general proximate relation to said substantially horizontal extending third frame member, a first substantially vertical extending side frame member coupling said substantially horizontal extending first frame member and said substantially horizontal extending third frame member, and a second substantially vertical extending side frame member coupling said substantially horizontal extending second frame member and said substantially horizontal extending fourth frame member wherein said second substantially vertical extending side frame member displaces generally longitudinally from said first substantially vertical extending side frame member, and said frame members define a stanchion opening therebetween; and,
  a restraining member disposed in said stanchion opening, said restraining member being pivotally mounted to said frame for movement between a first position with said restraining member extending diagonally across said stanchion opening and a second position with said restraining member having a substantially vertical orientation.

2. The stanchion according to claim 1, further comprising
  a displacing assembly couples to said substantially horizontal extending second frame member, and displaces said second substantially vertical extending side frame member generally longitudinally from said first substantially vertical extending side frame member; and,
  a latching assembly couples to said frame wherein said restraining member can be latched in a substantially vertical orientation.

3. The stanchion according to claim 1, wherein said substantially horizontal extending second frame member is in general proximate parallel relation to said substantially horizontal extending first frame member.

4. The stanchion according to claim 1, wherein said substantially horizontal extending second frame member is in general proximate coextensive relation to said substantially horizontal extending first frame member.

5. The stanchion according to claim 1, wherein said substantially horizontal extending fourth frame member is in general proximate parallel relation to said substantially horizontal extending third frame member.

6. The stanchion according to claim 1, wherein said substantially horizontal extending fourth frame member is in general proximate coextensive relation to said substantially horizontal extending third frame member.

7. The stanchion according to claim 1, wherein said first substantially vertical extending side frame member is fixed and said second substantially vertical extending side frame member is movable.

8. The stanchion according to claim 1, further comprising a positioning bracket coupling said first substantially vertical extending side frame member and a first handle coupling said first substantially vertical extending side frame member and coupling said substantially horizontal extending fourth frame member wherein said positioning bracket contains a plurality of coupling points wherein said first handle detachably couples with said positioning bracket adjusting the size of said stanchion opening.

9. The stanchion according to claim 1, wherein said second substantially vertical extending side frame member displaces generally diagonally, longitudinally from said first substantially vertical extending side frame member.

10. The stanchion according to claim 1, wherein said substantially horizontal extending fourth frame member is movable.

11. The stanchion according to claim 2, wherein said latching assembly couples to said substantially horizontal extending first frame member.

12. The stanchion according to claim 2, wherein said latching assembly couples to said substantially horizontal extending second frame member.

13. The stanchion according to claim 2, wherein said frame further comprising a plurality of brackets and a substantially horizontal extending fifth frame member wherein said plurality of brackets couples to said substantially horizontal extending first frame member and to said substantially horizontal extending fifth frame member wherein said substantially horizontal extending fifth frame member is in general proximate coextensive relation to said substantially horizontal extending first frame member and said latching assembly couples to said substantially horizontal extending fifth frame member wherein said latching assembly secures said restraining member in a substantially vertical orientation.

14. The stanchion according to claim 2, wherein said frame includes a plurality of substantially vertical extending side frame members with adjacent pairs of said substantially vertical extending side frame members each defining one stanchion opening therebetween; and, said displacing assembly couples to said substantially horizontal extending second frame member wherein a plurality of second substantially vertical extending side frame members displace generally longitudinally from a plurality of first substantially vertical extending side frame members.

15. The stanchion according to claim 2, wherein said displacing assembly further comprising a second handle, a link, a support housing, and an arched member wherein said support housing couples to said substantially horizontal extending first frame member, said support housing supports said second handle, said second handle pivotally couples with said link, said link pivotally couples with said arched member, and said arch member couples to said substantially horizontal extending second frame member wherein turning said second handle inverts said link, said link displaces longitudinally said arched member, said arched member displaces longitudinally said substantially horizontal extending second frame member, and said substantially horizontal extending second frame member displaces generally longitudinally said second substantially vertical extending side frame member from said first substantially vertical extending side frame member.

16. The stanchion according to claim 13, wherein said latching assembly further comprising a locking device wherein said locking device couples to said restraining member and said substantially horizontal extending fifth frame member wherein said restraining member is secured independent of the rotational orientation of said substantially horizontal extending fifth frame member.

17. A stanchion comprising:

a frame having a substantially horizontal extending first frame member, a substantially horizontal extending second frame member in general proximate coextensive relation to said substantially horizontal extending first frame member, a first substantially vertical extending side frame member coupling said substantially horizontal extending first frame member, and a second substantially vertical extending side frame member coupling said substantially horizontal extending second frame member wherein said second substantially vertical extending side frame member displaces generally longitudinally from said first substantially vertical extending side frame member and said frame members define a stanchion opening therebetween;

a restraining member disposed in said stanchion opening, said restraining member being pivotally mounted to said frame for movement between a first position with said restraining member extending diagonally across said stanchion opening and a second position with said restraining member having a substantially vertical orientation;

a displacing assembly couples to said substantially horizontal extending second frame member wherein said displacing assembly displaces said second substantially vertical extending side frame member generally longitudinally from said first substantially vertical extending side frame member;

a protrusion couples to said second substantially vertical extending side frame member securing said second substantially vertical extending side frame member in a substantially vertical orientation;

a latching assembly couples to said frame wherein said restraining member can be latched in a substantially vertical orientation; and said displacing assembly further comprising a handle, a gear means, an elongated bar wherein one end has a serrated side, an elongated bar sheath housing, and a plurality of brackets wherein said handle rotationally couples to said gear means, said plurality of brackets couples to said substantially horizontal extending first frame member and to said elongated bar sheath housing which contains part of said elongated bar, and said elongated bar couples to said substantially horizontal extending second frame member, and said gear means interacts with said elongated bar's serrated side wherein turning said handle rotates said gear means which displaces longitudinally said elongated bar and said substantially horizontal extending second frame member and displaces generally longitudinally said second substantially vertical extending side frame member from said first substantially vertical extending side frame member.

18. The stanchion as recited in claim 17, wherein said second substantially vertical extending side frame member detachably couples with said protrusion and diagonally displaces from said first substantially vertical extending side frame member.

19. The stanchion as recited in claim 17, wherein said latching assembly couples to said substantially horizontal extending first frame member.

20. The stanchion as recited in claim 17, wherein said latching assembly couples to said substantially horizontal extending second frame member.

21. The stanchion as recited in claim 17, further comprising a substantially horizontal extending third frame member coupling the lower end of said first substantially vertical extending side frame member and said protrusion.

22. The stanchion as recited in claim 17, wherein said frame includes a plurality of said substantially vertical extending side frame members with adjacent pairs of said substantially vertical extending side frame members each defining one stanchion opening therebetween; and said displacing assembly couples to said substantially horizontal extending second frame member wherein a plurality of second substantially vertical extending side frame members displaces generally longitudinally from a plurality of first substantially vertical extending side frame members.

23. The stanchion as recited in claim 17, comprising:

a support coupling generally perpendicular to said substantially horizontal extending first frame member and said substantially horizontal extending second frame member coupling said support; and said latching assembly comprising a plurality of latches securing said restraining member in a substantially vertical orientation and coupling said substantially horizontal extending second frame member which can be rotated wherein said plurality of latches can disengage said restraining member.

24. The stanchion as recited in claim 23, wherein said latching assembly further comprising a locking device coupling to said restraining member and said substantially horizontal extending second frame member and securing said restraining member independent of the rotational orientation of said substantially horizontal extending second frame member.

25. A method of acclimating animals to a stanchion, comprising the steps of:

providing a stanchion comprising a frame forming a stanchion opening therebetween, said frame further comprising a first substantially vertical extending side frame member and a second substantially vertical extending side frame member;

displacing said second substantially vertical extending side frame member parallely away from said first substantially vertical extending side frame member; and moving said second substantially vertical extending side frame member toward said first substantially vertical extending side frame member thereby reducing said stanchion opening for acclimating animals to said stanchion so that the animals may ultimately be restrained therein.

26. A method of acclimating animals to a stanchion, comprising the steps of:

providing a stanchion comprising a frame forming a stanchion opening therebetween, said frame further comprising a first substantially vertical extending side frame member and a second substantially vertical extending side frame member;

displacing said second substantially vertical extending side frame member away from said first substantially vertical extending side frame member; and moving said second substantially vertical extending side frame member toward said first substantially vertical extending side frame member thereby reducing said stanchion opening for acclimating animals to said stanchion so that the animals may ultimately be restrained therein; and longitudinally advancing said second substantially vertical extending side frame member toward said first substantially vertical extending side frame member over a period of at least two days.

* * * * *